United States Patent
Hesse et al.

(10) Patent No.: US 7,753,391 B1
(45) Date of Patent: Jul. 13, 2010

(54) TORSIONALLY-BIASED, SHOCK-ABSORBING FIFTH WHEEL HITCH

(75) Inventors: Jay Hesse, Pender, NE (US); Steven R. Lewis, Yankton, SD (US); Brent Culbertson, Dakota City, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 273 days.

(21) Appl. No.: 12/148,112

(22) Filed: Apr. 17, 2008

(51) Int. Cl.
*B62D 53/06* (2006.01)
*B62D 53/08* (2006.01)

(52) U.S. Cl. .................. 280/439; 280/433; 280/440

(58) Field of Classification Search ............ 280/433, 280/434, 435, 436, 437, 438.1, 439, 440, 280/441
See application file for complete search history.

(56) References Cited

U.S. PATENT DOCUMENTS

| | | | |
|---|---|---|---|
| 2,072,661 A | 3/1937 | Walther et al. | |
| 2,865,031 A | 12/1958 | Maloney | |
| 3,137,515 A | 6/1964 | Masser | |
| 3,257,124 A | 6/1966 | Mendez | |
| 4,253,679 A | 3/1981 | Sargent | |
| 5,171,036 A | 12/1992 | Ross | |
| 5,226,675 A | 7/1993 | Noah et al. | |
| 5,328,198 A | 7/1994 | Adams | |
| 5,356,167 A | 10/1994 | Hall et al. | |
| 5,529,329 A * | 6/1996 | McCoy .................. | 280/438.1 |
| 5,639,106 A | 6/1997 | Vitale et al. | |
| 5,785,341 A | 7/1998 | Fenton | |
| 5,823,560 A | 10/1998 | Van Vleet | |
| 5,836,603 A | 11/1998 | Logan et al. | |
| 5,839,745 A | 11/1998 | Cattau et al. | |
| 5,851,021 A | 12/1998 | Van Kley | |
| 6,116,631 A | 9/2000 | Logan et al. | |
| 6,170,849 B1 | 1/2001 | McCall | |
| 6,170,850 B1 | 1/2001 | Works | |
| 6,176,529 B1 | 1/2001 | Kitzmiller et al. | |
| 6,182,997 B1 | 2/2001 | Ullrich et al. | |
| 6,398,249 B1 | 6/2002 | Lindenman et al. | |
| 6,474,674 B2 | 11/2002 | Piercey, III | |
| 6,581,951 B2 | 6/2003 | Lange | |
| 6,695,338 B1 | 2/2004 | Roberts | |
| 6,726,396 B2 | 4/2004 | Plett | |
| 6,746,037 B1 | 6/2004 | Kaplenski et al. | |
| 6,913,276 B1 | 7/2005 | Bauder | |
| 6,957,825 B2 | 10/2005 | Peters | |
| 7,044,493 B1 | 5/2006 | Wilson | |
| 7,192,045 B2 | 3/2007 | Gurtler | |
| 7,261,311 B2 * | 8/2007 | Lindenman et al. ......... | 280/433 |

(Continued)

*Primary Examiner*—Lesley D Morris
*Assistant Examiner*—Marc A Scharich
(74) *Attorney, Agent, or Firm*—Donald R. Schoonover

(57) ABSTRACT

A torsionally-biased, shock-absorbing fifth wheel hitch includes a first mounting mechanism removably and non-rotatably mounting a lower frame portion thereof to the bed of a towing vehicle; an upper frame portion; a second mounting mechanism with a pair of opposing resilient members pivotally mounting the upper frame portion about a horizontally-oriented transverse hitch axis relative to the lower frame portion, the second mounting mechanism having an inactivated configuration wherein the upper frame member is not pivotally biased about the transverse hitch axis relative to the lower frame member and an activated configuration wherein the upper frame member is pivotally biased about the transverse hitch axis relative to the lower frame member; and a fifth wheel hitch mechanism mounted to the upper frame portion.

19 Claims, 4 Drawing Sheets

U.S. PATENT DOCUMENTS 7,380,810 B1 * 6/2008 Wilkens et al. ............. 280/439
7,552,937 B1 * 6/2009 Taylor ........................ 280/439

2006/0043694 A1 3/2006 Kaun

* cited by examiner

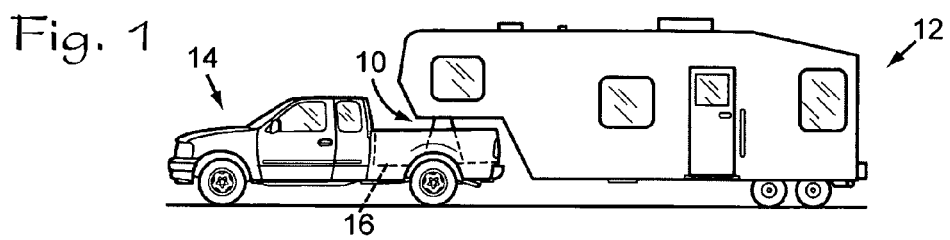
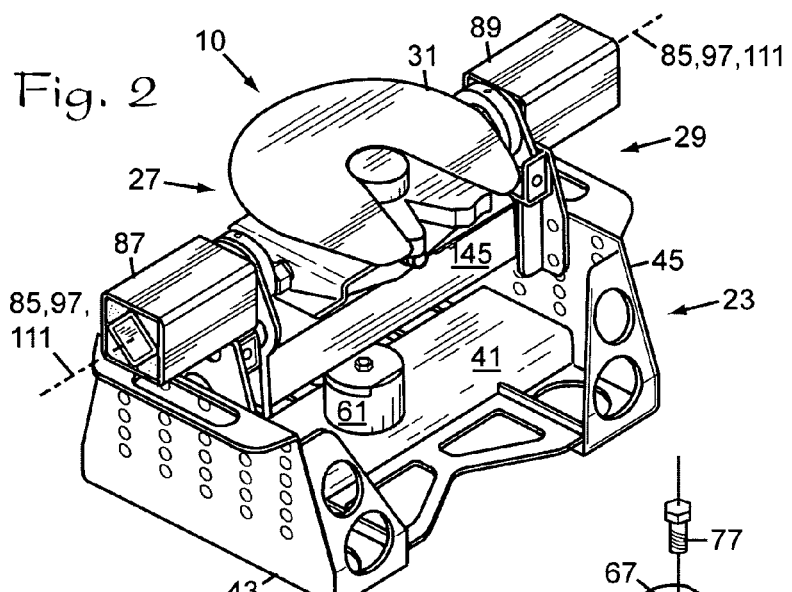
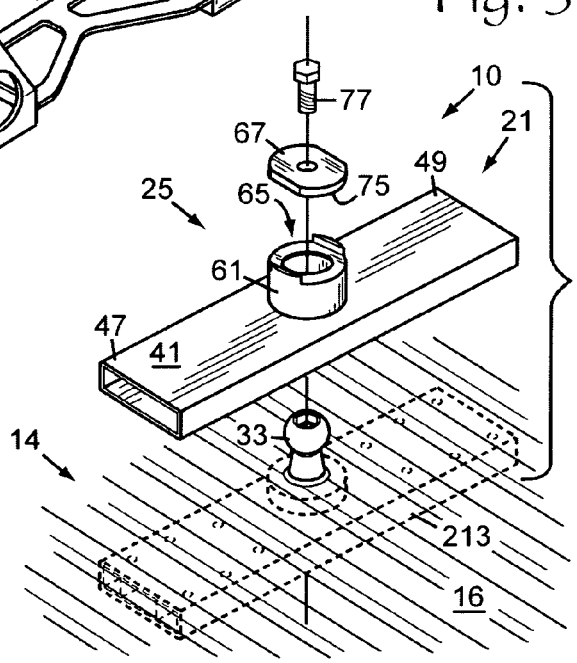
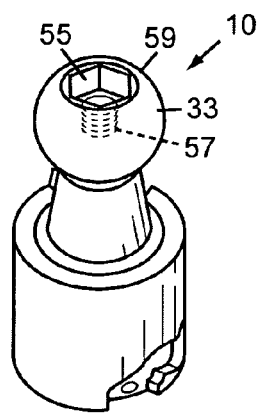
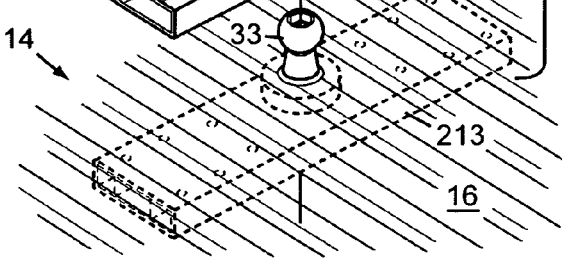

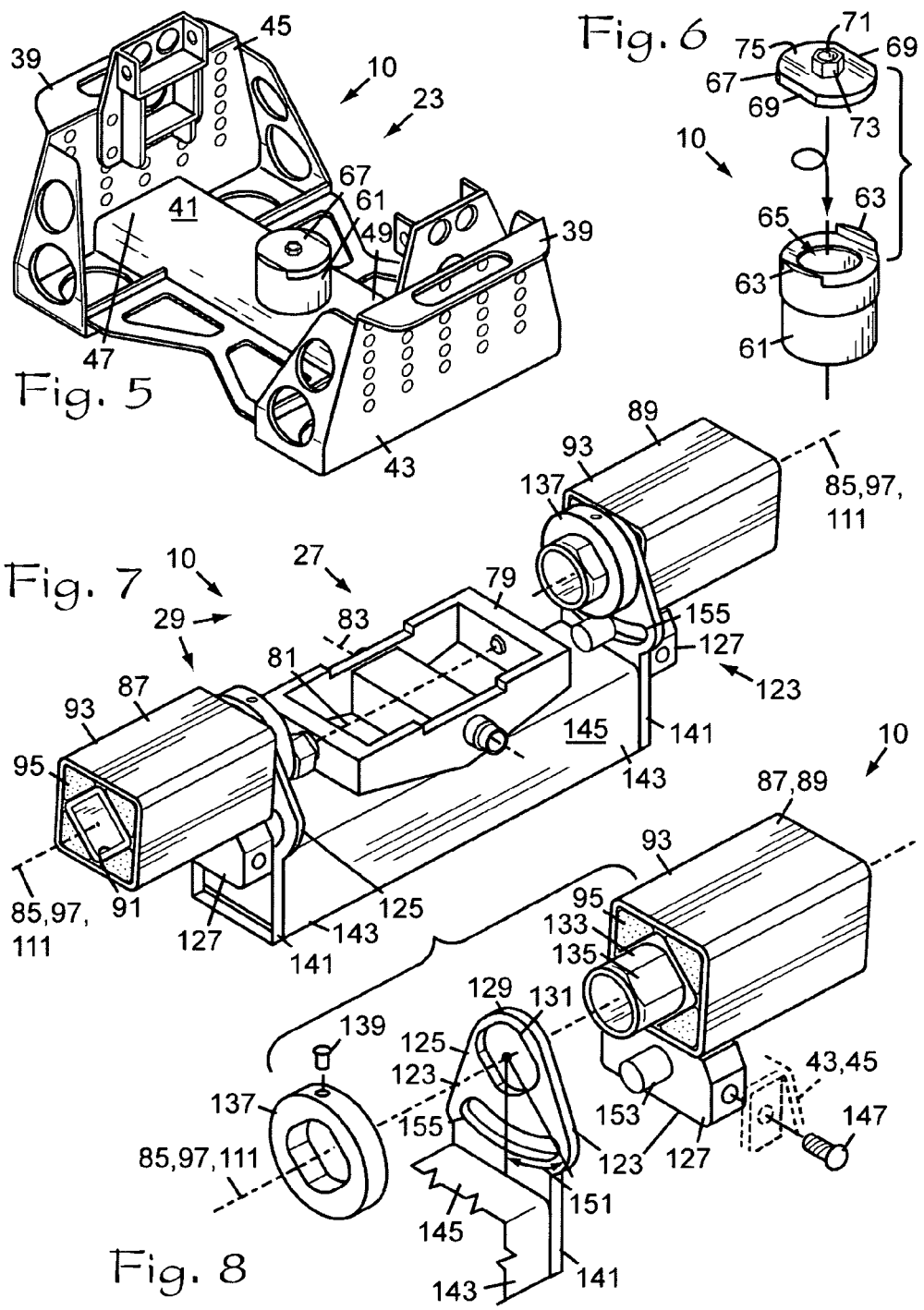

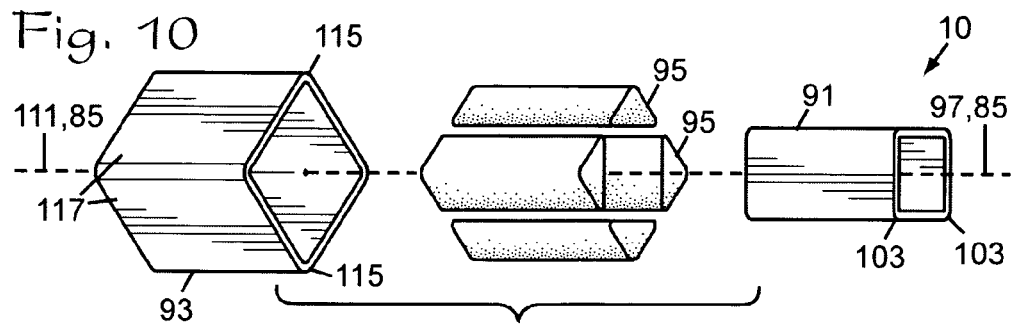
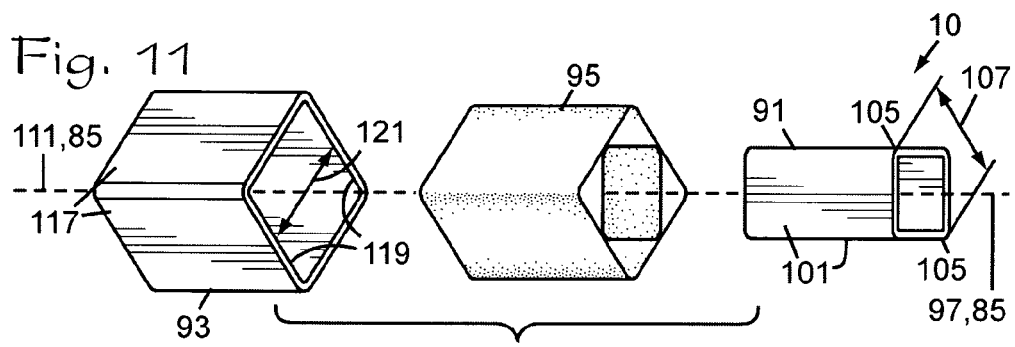
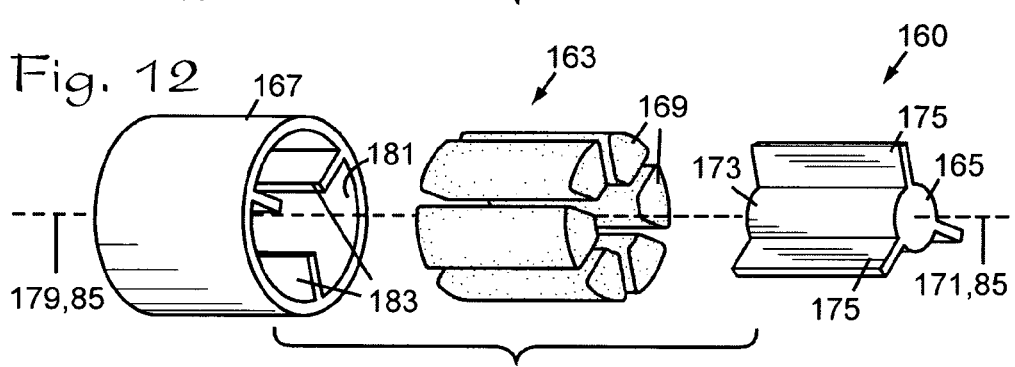
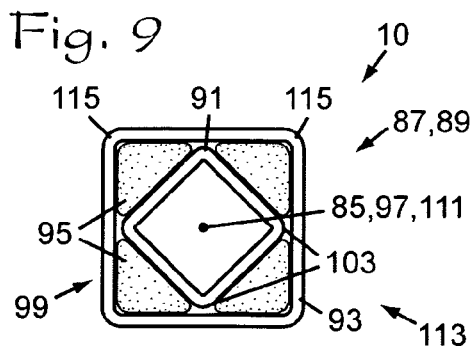
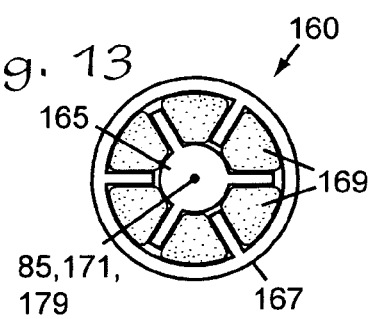

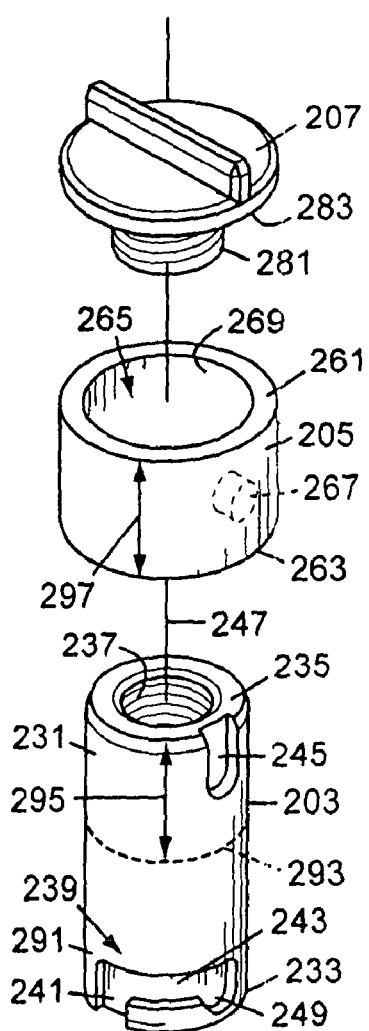
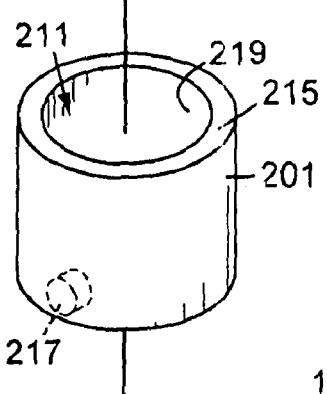
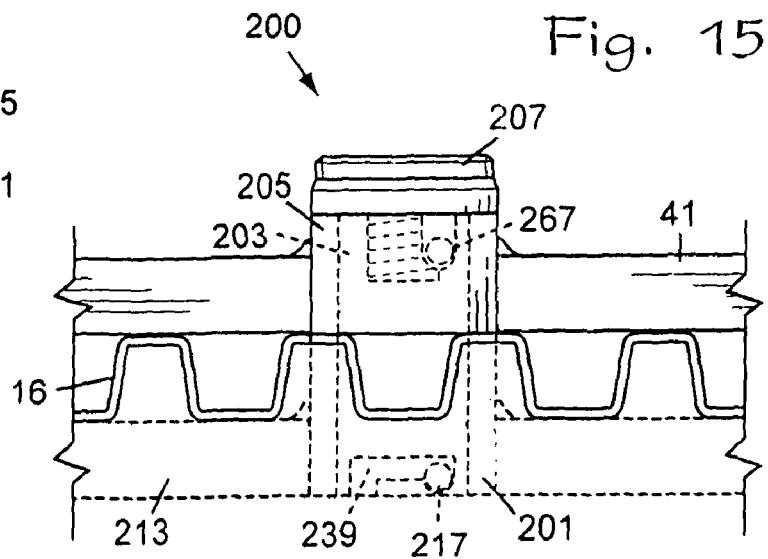

TORSIONALLY-BIASED, SHOCK-ABSORBING FIFTH WHEEL HITCH

BACKGROUND OF THE INVENTION

1. Field of the Invention

The present invention relates to hitches for towing a vehicle with another vehicle and, more specifically without limitation, to hitches for towing a fifth wheel or gooseneck trailer behind a pickup, flatbed truck, or other towing vehicle.

2. Description of the Related Art

A fifth wheel or gooseneck trailer is pivotally connected about a vertically oriented axis to another vehicle for towing purposes. The trailer may include a kingpin for releasable connection to a hitch mounted on the towing vehicle. Alternatively, the trailer may include a hitch ball for releasable connection to a fifth wheel hitch mounted on the towing vehicle. When the trailer or towing vehicle hits a bump or depression or either vehicle attempts to, or is caused to, accelerate or decelerate relative to the other vehicle, the towing vehicle and trailer lurch back and forth, buffeting against each other. Not only is that situation aggravating, annoying and uncomfortable, it could cause substantial wear and tear on both the trailer and the towing vehicle and is potentially dangerous, perhaps causing substantial damage to both vehicles and even serious or fatal injuries to occupants of the two vehicles.

Various prior art shock-absorbing fifth wheel hitch assemblies have been developed in an attempt to at least partially alleviate such potential hazards. Unfortunately, most if not all of the prior art assemblies are bulky, have several moving parts which are subject to substantial wear and failure with disastrous results, and are overly complicated. There is room for further improvement for an effective means of alleviating the undesirable buffeting that occurs between a fifth-wheel or gooseneck trailer and a vehicle towing the trailer.

What is needed is an improved shock-absorbing fifth wheel hitch for connecting a fifth-wheel or gooseneck trailer to a towing vehicle wherein the apparatus is not overly bulky and has relatively simple construction.

SUMMARY OF THE INVENTION

The improvements of the present invention for a torsionally-biased, shock-absorbing fifth wheel hitch for connecting a fifth wheel or gooseneck trailer to a towing vehicle having a bed includes a lower frame portion having a lower element and transversely-positioned first and second side members fixedly secured to and extending upwardly from opposing ends of the lower element, a first mounting mechanism, an upper frame portion, a second mounting mechanism, and a fifth wheel hitch mechanism mounted to the upper frame portion.

The first mounting mechanism, which is structured to removably and non-rotatably mount the lower frame portion to the hitch ball, includes a ball hitch member with a hitch ball fixedly mounted to, and extending upwardly from, the bed of the towing vehicle; a non-circular cavity with a tapped partial bore formed in an upper extremity of the hitch ball; a receiver member fixedly secured to the lower element wherein the receiver member includes a first stop mechanism and a ball cavity structured to receive the hitch ball therein; a stop plate having a second stop mechanism which is structured to mate with the first stop mechanism, a plate throughbore, and a protrusion structured to mate with the non-circular cavity; and a fastener structured to threadably mate with the tapped partial bore wherein the protrusion operatively and non-rotatably mates with the non-circular cavity and the second stop mechanism operatively and non-rotatably mates with the first stop mechanism.

An alternate embodiment of the first mounting mechanism includes a receiver element, an adapter element, a bushing element, and a clamping element. The receiver element is fixedly secured to a cross member fixedly secured to the bed of the towing vehicle and includes a receiver cavity. The adapter element has a lower end and an upper end with a tapped partial bore wherein the lower end is removably and non-rotatably securable in the receiver cavity. The bushing element, which is fixedly secured to the lower element of the lower frame portion, includes a bushing cavity structured and dimensioned wherein the upper end of the adapter element is removably and non-rotatably securable in the bushing cavity. The clamping element includes a threaded portion structured and dimensioned to threadably mate with the tapped partial bore of the adapter element. The clamping element, cooperatively with the tapped partial bore, operably and non-rotatably clamps the bushing element, the adapter element, and the receiver element together while also clamping the lower element to the bed of the towing vehicle.

The upper frame portion includes a gimbal pivotally mounted about transverse and fore-to-aft gimbal axes.

The second mounting mechanism, which is structured to pivotally mount the upper frame portion about a horizontally- and transversely-oriented hitch axis relative to the lower frame portion, includes a pair of opposing resilient members, and a pair of opposing brackets.

Each resilient member of the pair of opposing resilient members includes an inner shell member with a longitudinal axis aligned colinearly with the transverse hitch axis wherein the inner shell member has a square-shaped cross-section with four sides and four rounded corners and opposing outer corner surfaces thereof are spaced apart by a predetermined first dimension.

Each resilient member of the pair of opposing resilient members also includes an outer shell member with a longitudinal axis aligned colinearly with the transverse hitch axis wherein the outer shell member has a square-shaped cross-section with four corners and sides and opposing inner side surfaces thereof are spaced apart by a predetermined second dimension with the magnitude of the predetermined second dimension being greater than the magnitude of the predetermined first dimension. The outer shell member is rotated approximately 45° about the transverse hitch axis relative to the inner shell member.

The plurality of elongate resilient elements are spaced between the outer and inner shell members wherein each resilient element is positioned between a respective side of the inner shell member and a respective corner of the outer shell member of a respective one of the pair of opposing resilient members.

Each of the pair of opposing brackets has an upper bracket portion fixedly secured to the upper frame portion and non-rotatably secured to the inner shell member of a respective one of the resilient members, and a lower bracket portion fixedly secured to the outer shell member of the respective resilient member and to a respective one of the first and second side members. Each upper bracket portion is mounted to the lower bracket portion of the respective bracket wherein angular displacement of the upper bracket portion relative to the lower bracket portion is limited to a maximum predetermined angle about the transverse hitch axis.

The second mounting mechanism has an inactivated configuration wherein the upper frame portion is not pivotally biased about the transverse hitch axis relative to the lower frame portion and an activated configuration wherein the upper frame portion is pivotally biased about the transverse hitch axis relative to the lower frame portion.

The second mounting mechanism is structured wherein, when relative fore and aft movements between the fifth wheel or gooseneck trailer and the towing vehicle cause the upper frame portion to be displaced about the transverse hitch axis from the inactivated configuration to the activated configuration, the plurality of resilient members responsively bias the inner shell members and the upper frame portion about the transverse hitch axis relative to the outer shell members and the lower frame portion toward the inactivated configuration.

In a modified embodiment, the inner and outer shell members are cylindrically-shaped with the plurality of resilient elements spaced between alternately arranged, radially-oriented vanes of the inner and outer shell members.

PRINCIPAL OBJECTS AND ADVANTAGES OF THE INVENTION

The principal objects and advantages of the present invention include: providing a shock-absorbing fifth wheel hitch for towing a gooseneck or fifth wheel hitch behind a truck; providing such a fifth wheel hitch wherein shock-absorption is torsionally-biased; providing such a torsionally-biased, shock-absorption fifth wheel hitch wherein the biasing occurs about an horizontally- and transversely-oriented axis; and generally providing such a shock-absorbing fifth wheel hitch that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a side elevational view of a towing vehicle towing a fifth wheel trailer with a torsionally-biased, shock-absorbing fifth wheel hitch according to the present invention.

FIG. 2 is an enlarged rear, side and top perspective view of the torsionally-biased, shock-absorbing fifth wheel hitch.

FIG. 3 is an enlarged and exploded, perspective view of a first mounting mechanism of the torsionally-biased, shock-absorbing fifth wheel hitch.

FIG. 4 is a further enlarged and perspective view of a hitch ball of the torsionally-biased, shock-absorbing fifth wheel hitch.

FIG. 5 is an enlarged perspective view of a lower frame portion of the torsionally-biased, shock-absorbing fifth wheel hitch.

FIG. 6 is a further enlarged perspective view of a receiver member and a stop plate of the torsionally-biased, shock-absorbing fifth wheel hitch.

FIG. 7 is a further enlarged perspective view of an upper frame portion of the torsionally-biased, shock-absorbing fifth wheel hitch.

FIG. 8 is a further enlarged and exploded, schematic and perspective view of one of a pair of opposing brackets of the torsionally-biased, shock-absorbing fifth wheel hitch.

FIG. 9 is a schematic representation of an end view of a resilient member of the torsionally-biased, shock-absorbing fifth wheel hitch.

FIG. 10 is an exploded and perspective schematic representation of the resilient member of the torsionally-biased, shock-absorbing fifth wheel hitch shown in FIG. 9.

FIG. 11 is an exploded and perspective schematic representation of the resilient member wherein a single resilient element substantially occupies the entire space between the inner and outer shell members of the resilient member of the torsionally-biased, shock-absorbing fifth wheel hitch, according to the present invention.

FIG. 12 is an exploded and perspective schematic representation of a modified embodiment of a resilient member of the torsionally-biased, shock-absorbing fifth wheel hitch, according to the present invention.

FIG. 13 is a schematic representation of an end view of the modified embodiment of the resilient member of the torsionally-biased, shock-absorbing fifth wheel hitch shown in FIG. 12.

FIG. 14 is an enlarged and exploded, perspective view of an alternate embodiment of the first mounting mechanism of the torsionally-biased, shock-absorbing fifth wheel hitch, according to the present invention.

FIG. 15 is an enlarged side elevational view of the alternate embodiment of the first mounting mechanism of the torsionally-biased, shock-absorbing fifth wheel hitch, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 refers generally to a torsionally-biased, shock-absorbing fifth wheel hitch apparatus in accordance with the present invention, as shown in FIGS. 1 through 11, wherein the apparatus 10 is structured and configured to enable connection of a fifth wheel or gooseneck trailer 12 to a towing vehicle 14 having a bed 16. The apparatus 10 includes a ball hitch member 21, a lower frame portion 23, a first mounting mechanism 25, an upper frame portion 27, a second mounting mechanism 29, and a fifth wheel hitch mechanism 31.

The ball hitch member 21 is mounted to, and extending upwardly from, the bed 16 of the towing vehicle 14, as shown in FIG. 3. If desired, the ball hitch member 21 may include a removable and/or invertible hitch ball 33 such as, for example, the hitch ball disclosed in GOOSENECK HITCH ASSEMBLY of Paul D. Roberts, U.S. Pat. No. 6,695,338, which is incorporated herein by reference.

The lower frame portion 23 includes lifting and maneuvering handles 39, a lower element 41, and transversely-positioned first and second side members 43, 45 fixedly secured to, and extending upwardly from, opposing ends 47, 49 of the lower element 41, as shown in FIG. 5.

The first mounting mechanism 25 is structured to removably and non-rotatably mount the lower frame portion 23 to the hitch ball 33. The first mounting mechanism 25 includes a non-circular cavity 55 with a tapped partial bore 57 formed in an upper extremity 59 of the hitch ball 33, as shown in FIG. 4. The first mounting mechanism 25 also includes a receiver member 61 fixedly secured to the lower element 41 wherein the receiver member 61 includes a first stop mechanism 63 and a ball cavity 65 structured to receive the hitch ball 33 therein.

The first mounting mechanism 25 also includes a stop plate 67 with a second stop mechanism 69 which is structured to mate with the first stop mechanism 63, a plate throughbore 71, and a protrusion 73 on a lower side 75 of the stop plate 67 which is structured to mate with the non-circular cavity 55 of the hitch ball 33. The first mounting mechanism 25 further includes a fastener 77, such as a stud 77 for example, which is structured to threadably mate with the tapped partial bore 57 of the hitch ball 33 wherein the protrusion 73 operatively and non-rotatably mates with the non-circular cavity 55 and the second stop mechanism 69 of the stop plate 67 operatively and non-rotatably mates with the first stop mechanism 63, as indicated in FIGS. 3 and 6.

The upper frame portion 27 includes a gimbal 79 pivotally mounted about a transverse gimbal axis 81 and a fore-to-aft gimbal axis 83.

The second mounting mechanism 29 is structured to pivotally mount the upper frame portion 27 about a horizontally- and transversely-oriented hitch axis 85 relative to the lower frame portion 23. The second mounting mechanism 29 includes a pair of opposing resilient members 87, 89. Each of the resilient members 87, 89 includes an inner shell member 91, an outer shell member 93, and at least one elongate resilient element 95.

Each inner shell member 91 has longitudinal axis 97 aligned colinearly with the transverse hitch axis 85 and a square-shaped cross-section 99 with four sides 101 and four rounded corners 103 wherein opposing outer corner surfaces 105 thereof are spaced apart by a predetermined first dimension 107 as shown in FIGS. 9, 10 and 11.

Each outer shell member 93 has a longitudinal axis 111 aligned colinearly with the transverse hitch axis 85 and a square-shaped cross-section 113 with four corners 115 and sides 117 wherein opposing inner side surfaces 119 thereof are spaced apart by a predetermined second dimension 121, as shown in FIGS. 9, 10 and 11. The magnitude of the predetermined second dimension 121 is greater than the magnitude of the predetermined first dimension 107. The outer shell member 93 is rotated approximately 45° about the transverse hitch axis 85 relative to the inner shell member 91, as shown in FIG. 9.

The at least one elongate resilient element 95 generally includes four elongate resilient elements 95 spaced between the inner and outer shell members 91, 93 as shown in FIG. 9, wherein one of the resilient elements 95 is spaced between a respective side 101 of the inner shell member 91 and a respective corner 115 of the outer shell member 93 of a respective one of the pair of opposing resilient members 87, 89.

Preferably, each at least one elongate resilient element 95 abuttingly engages and is compressed between surfaces 101, 117 of the inner and outer shell members 91, 93 adjacent thereto, as shown in FIG. 9.

For some applications, it may be desirable that the at least one resilient element 95 be structured and dimensioned to substantially occupy the entire space between the inner and outer shell members 91, 93, as shown in FIG. 11.

The second mounting mechanism 29 includes a pair of opposing brackets 123, each having a first bracket portion 125 and a second bracket portion 127. The first bracket portion 125 has an upper bracket end 129 structured for non-rotatable securement to the inner shell member 93 of a respective one of the resilient members 87, 89. For example, the upper bracket end 129 may include a non-circular orifice 131 structured to non-rotatably mate with a non-circularly-shaped end 133 with flat surfaces 135 of the inner shell member 91, as shown in FIG. 8. A collar 137 with a set screw 139, for example, removably secures the non-circular orifice 131 in non-rotatable engagement with the non-circularly-shaped end 133 of the inner shell member 91.

The first bracket portion 125 also includes a lower bracket end 141 fixedly secured to an end 143 of a cross member 145 of the upper frame portion 27, as shown in FIGS. 7 and 8. Each of the second bracket portions 127 is fixedly secured to a respective outer shell member 93 and to a respective one of the first and second side members 43, 45, such as with a stud 147 as shown in FIG. 8 for example.

The apparatus 10 is structured and dimensioned wherein the second mounting mechanism 29 has an inactivated configuration wherein the upper frame portion 27 is not pivotally biased about the transverse hitch axis 85 relative to the lower frame portion 23, and an activated configuration wherein the upper frame portion 27 is pivotally biased about the transverse hitch axis 85 relative to the lower frame portion 23.

In other words, the second mounting mechanism 29 is structured wherein, when relative fore and aft movements between the fifth wheel or gooseneck trailer 12 and the towing vehicle 14 cause the upper frame portion 27 to be displaced about the transverse hitch axis 85 from the inactivated configuration to the activated configuration, the resilient elements 95 responsively bias the respective inner shell members 91 and the upper frame portion 27 relative to the outer shell members 93 and the lower frame portion 23 about the transverse hitch axis 85 toward the inactivated configuration.

Each of the opposing brackets 123 is structured to limit angular displacement of the outer shell member 93 about the transverse hitch axis 85 relative to the inner shell member 91 of a respective one of the opposing resilient member 87, 89 to a maximum predetermined angle 151. For example, each second bracket portion 127 may include a horizontally-oriented peg 153 slidably captured in an arcuate slot 155 formed in the lower bracket end 141 of the respective bracket 123, as shown in FIGS. 7 and 8. The peg 153 and slot 155 are structured and dimensioned wherein the peg 153 is slidably displaced along the slot 155 as the upper frame portion 27 is displaced to and from the activated and inactivated configurations relative to the lower frame portion 23 about the transverse hitch axis 85.

The fifth wheel hitch mechanism 31 is mounted to the upper frame portion 27, as shown in FIG. 2.

The reference numeral 160 refers generally to a modified embodiment of the torsionally-biased, shock-absorbing fifth wheel hitch apparatus in accordance with the present invention, as shown in FIGS. 12 and 13. The descriptions of many of the features of the modified embodiment 160 are substantially similar to those hereinbefore described for embodiment 10 and will not be reiterated here in detail.

The modified embodiment 160 includes a pair of opposing resilient members 163, only one of which is shown schematically in FIGS. 12 and 13. Each of the resilient members 163 includes an inner shell member 165, an outer shell member 167, and a plurality of elongate resilient elements 169.

Each inner shell member 165 has a longitudinal axis 171 aligned colinearly with the transverse hitch axis 85 and a cylindrically-shaped outer surface 173 with three equi-angularly-spaced vanes 175 extending radially outwardly from the longitudinal axis 171. As hereinbefore described, the inner shell member 165 is non-rotatably secured to the upper frame portion 27.

Each outer shell member 167 has a longitudinal axis 179 aligned colinearly with the transverse hitch axis 85 and a cylindrically-shaped inner surface 181 with three equi-angularly-spaced vanes 183 extending radially inwardly toward the longitudinal axis, as shown in FIG. 12. The outer shell member 167 is rotated approximately 60° about the transverse hitch axis 85 relative to the inner shell member 165, as shown in FIG. 13 wherein the three vanes 175 of the inner shell member 165 are alternately spaced between the three vanes 183 of the outer shell member 167.

Each of the plurality of resilient elements 169 are spaced between a respective vane 175 of the inner shell member 165 and a respective vane 183 of the outer shell member 167.

Preferably, each of the elongate resilient elements 169 abuttingly engage, and are compressed between, adjacent surfaces of the respective vanes 175, 183 and the inner surface 181 of the outer shell member 167.

An alternate embodiment 200 of the first mounting mechanism 25 is shown in FIGS. 14 and 15. The alternate embodiment 200 includes a receiver element 201, an adapter element 203, a bushing element 205, and a clamping element 207.

The receiver element 201 includes a cylindrically-shaped receiver cavity 211. The receiver element 201 is fixedly secured to a cross member 213 fixedly secured to the bed 16 of the towing vehicle 14, such as by welding or other suitable means, wherein an upper end 215 of the receiver element 201 is spaced approximately flush with the bed 16 of the towing vehicle 14. The receiver element 201 includes a receiver peg 217 extending radially inwardly from a cavity wall 219 of the receiver cavity 211.

The adapter element 203 is cylindrically-shaped and includes an outer wall 231, a lower end 233, and an upper end 235 with a tapped partial bore 237. The adapter element 203 includes a lower slot 239 having a vertical portion 241 extending longitudinally upwardly from the lower end 233 and along the outer wall 231, as shown in FIG. 14. The lower slot 239 also includes a horizontal portion 243 opening into the vertical portion 241 and extending peripherally along the outer wall 231 near the lower end 233, as shown in FIG. 14.

The adapter element 203 also includes an upper slot 245 extending longitudinally from the upper end 235 of the adapter element 203 and along the outer wall 231, as shown in FIG. 14.

The adapter element 203 is removably and non-rotatably securable to the receiver element 201 by slidably inserting the lower end 233 of the adapter element 203 downwardly into the receiver cavity 211 such that the receiver peg 217 is received by the vertical portion 241 of the lower slot 239. The adapter element 203 is then rotated about axis 247 causing the receiver peg 217 to be positioned in detent 249 of the horizontal portion 243 of the lower slot 239.

The bushing element 205 includes an upper end 261, a lower end 263, a bushing cavity 265, and a bushing peg 267 extending radially inwardly from a bushing wall 269 of the bushing cavity 265. The bushing element 205 is removably and non-rotatably securable to the adapter element 203 by slidably inserting the lower end 263 of the bushing element 205 downwardly around the adapter element 203 wherein the upper end 235 of the adapter element 203 is received in the bushing cavity 265 and the bushing peg 267 is received by the upper slot 245 of the adapter element 203.

The clamping element 207 includes a threaded portion 281 extending downwardly from a lower surface 283 thereof, as shown in FIG. 14. The threaded portion 281 is structured and dimensioned to threadably mate with the tapped partial bore 237 of the adapter element 203. The clamping element 207, cooperatively with the tapped partial bore 237, operably and non-rotatably clamps the bushing element 205, the adapter element 203, and the receiver element 201 together while also operably and non-rotatably clamping the lower element 41 to the bed 16 of the towing vehicle 14.

In an application of the present invention wherein the torsionally-biased shock-absorbing fifth wheel hitch 10 utilizes the first-described first mounting mechanism 25, the ball hitch member 21 is securely and non-rotatably mounted to the bed 16 of the towing vehicle 14, such as with the cross member 213. The lower element 41 of the lower frame portion 23 is placed down over the ball hitch member 21 so the hitch ball 33 is received in the ball cavity 65 of the receiver member 61. The stud 77 is then inserted through the throughbore 71 of the stop plate 67 and the protrusion 73, through the non-circular cavity 55 of the hitch ball 33, and threadably secured to the tapped partial bore 57 such that the protrusion 73 operatively and non-rotatably mates with the non-circular cavity 55 and the first stop mechanism 63 of the stop plate 67 operatively and non-rotatably mates with the second stop mechanism 69. The gooseneck or fifth wheel trailer 12 is then removably secured to the fifth wheel hitch mechanism 31.

As the towing vehicle 14 tows the gooseneck or fifth wheel trailer 12, relative fore and aft movements between the gooseneck or fifth wheel trailer 12 and the towing vehicle 14 cause the upper frame portion 27 to be displaced about the transverse hitch axis 85 from the inactivated configuration to the activated configuration whereupon the resilient elements 95 responsively bias the respective outer shell members 93 and the upper frame portion 27 about the transverse hitch axis 85 relative to the inner shell members 91 and the lower frame portion 23 toward the inactivated configuration.

In an application of the present invention wherein the torsionally-biased shock-absorbing fifth wheel hitch 10 utilizes the alternate embodiment 200 of the first mounting mechanism 25, the receiver element 201 is fixedly and non-rotatably mounted to the bed 16 of the towing vehicle 14, such as by means of the cross member 213. The lower end 233 of the adapter element 203 is then inserted into the receiver cavity 211 with the receiver peg 217 being received by the vertical portion 241 of the lower slot 239. The adapter element 203 is then rotated about axis 247 causing the receiver peg 217 to travel along the horizontal portion 243 of the lower slot 239 and to be positioned in the detent 249. An inserted part 291 of the adapter element 203 is then contained within the receiver cavity 211, as indicated by the dashed line 293 in FIG. 14. The upper end 235 of the adapter element 203 is then spaced a distance 295 above the upper end 215 of the receiver element 201.

The lower end 263 of the bushing element 205 is then placed downwardly over and around the adapter element 203 such that the upper end 235 of the adapter element 203 is received by the bushing cavity 265 with the bushing peg 267 being received by the upper slot 245. The magnitude of spacing 297 between the upper and lower ends 261, 263 of the bushing element 205 is at least as great as the magnitude of distance 295. As a result, when the threaded portion 281 of the clamping element 207 is being securely mated with the tapped partial bore 237 of the adapter element 203, the lower surface 283 of the clamping element 207 abuttingly engages the upper end 261 of the bushing element 205 and the lower end 263 of the bushing element 205 abuttingly engages the upper end 215 of the receiver element 291, thereby firmly and non-rotatably seating the receiver peg 217 in the detent 249 and also non-rotatably securing the lower frame portion 23 against the bed 16 of the towing vehicle 14.

It is to be understood that while certain forms of the present invention have been illustrated and described herein, it is not to be limited to the specific forms or arrangement of parts as described and shown.

What is claimed and desired to be covered by Letters Patent is as follows:

1. An apparatus for connecting a fifth wheel or gooseneck trailer to a towing vehicle having a bed, the apparatus comprising:
   (a) a lower frame portion having a lower element, and transversely-positioned first and second side members fixedly secured to, and extending upwardly from, opposing ends of the lower element;
   (b) a first mounting mechanism structured to removably and non-rotatably mount the lower frame portion to the bed of the towing vehicle; the first mounting mechanism including:
      (1) a receiver element fixedly secured to the bed of the towing vehicle and having a receiver cavity;
      (2) an adapter element having a lower end and an upper end with a tapped partial bore, the lower end of the adapter element being removably and non-rotatably securable in the receiver cavity of the receiver element;
      (3) a bushing element fixedly secured to the lower element of the lower frame portion; the bushing element having a bushing cavity and being structured and dimensioned wherein the upper end of the adapter element is removably and non-rotatably securable in the bushing cavity; and
      (4) a clamping element having a threaded portion structured and dimensioned to threadably mate with the tapped partial bore of the adapter element; the clamping element, cooperatively with the tapped partial bore, being structured and dimensioned to operably and non-rotatably clamp the bushing element, the adapter element, and the receiver element together while also clamping the lower element to the bed of the towing vehicle;
   (c) an upper frame portion including a gimbal pivotally mounted about transverse and fore-to-aft gimbal axes;
   (d) a second mounting mechanism structured to pivotally mount the upper frame portion about a horizontally- and transversely-oriented hitch axis relative to the lower frame portion, the second mounting mechanism including:
      (1) a pair of opposing resilient members, each having:
         (A) an inner shell member with a longitudinal axis aligned colinearly with the transverse hitch axis, the inner shell member having a square-shaped cross-section with four sides and four rounded corners wherein opposing outer corner surfaces thereof are spaced apart by a predetermined first dimension,
         (B) an outer shell member with a longitudinal axis aligned colinearly with the transverse hitch axis, the outer shell member having a square-shaped cross-section with four corners and sides wherein opposing inner side surfaces thereof are spaced apart by a predetermined second dimension and wherein a magnitude of the predetermined second dimension is greater than a magnitude of the predetermined first dimension, the outer shell member being rotated approximately 45° about the transverse hitch axis relative to the inner shell member, and
         (C) a plurality of elongate resilient elements spaced between the outer and inner shell members, each resilient element being spaced between a respective side of the inner shell member and a respective corner of the outer shell member of a respective one of the pair of opposing resilient members;
      (2) a pair of opposing brackets, each having a first bracket portion fixedly secured to the upper frame portion and to a respective one of the inner shell members and a second bracket portion fixedly secured to a respective one of the outer shell members and to a respective one of the first and second side members; each of the opposing brackets structured to limit angular displacement of the outer shell member relative to the inner shell member of the respective resilient member to a maximum predetermined angle about the transverse hitch axis, and
   (e) a fifth wheel hitch mechanism mounted to the upper frame portion; and
   (f) wherein the second mounting mechanism has an inactivated configuration wherein the upper frame portion is not pivotally biased about the transverse hitch axis relative to the lower frame portion, and an activated configuration wherein the upper frame portion is pivotally biased about the transverse hitch axis relative to the lower frame portion, and
   (g) wherein the second mounting mechanism is structured wherein, when relative fore and aft movements between the fifth wheel or gooseneck trailer and the towing vehicle cause the upper frame portion to be displaced about the transverse hitch axis from the inactivated configuration to the activated configuration, the plurality of resilient elements responsively bias the respective inner shell members and the upper frame portion relative to the outer shell members and the lower frame portion about the transverse hitch axis toward the inactivated configuration.

2. An apparatus for connecting a fifth wheel or gooseneck trailer to a towing vehicle having a bed, the apparatus comprising:
   (a) a lower frame portion having a lower element, and transversely-positioned first and second side members fixedly secured to, and extending upwardly from, opposing ends of the lower element;
   (b) a first mounting mechanism structured to removably and non-rotatably mount the lower frame portion to the bed of the towing vehicle; the first mounting mechanism including:
      (1) a ball hitch member including a hitch ball fixedly secured to, and extending upwardly from, the bed of the towing vehicle, the hitch ball having a non-circular cavity with a tapped partial bore formed in an upper extremity thereof;
      (2) a receiver member fixedly secured to the lower element of the lower frame portion, the receiver member having a first stop mechanism and a ball cavity structured to receive the hitch ball therein,
      (3) a stop plate having a second stop mechanism structured to mate with the first stop mechanism, a plate throughbore, and a protrusion structured to mate with the non-circular cavity, and
      (4) a fastener structured to threadably mate with the tapped partial bore wherein the protrusion operatively and non-rotatably mates with the non-circular cavity and the first stop mechanism operatively and non-rotatably mates with the second stop mechanism;
   (c) an upper frame portion including a gimbal pivotally mounted about transverse and fore-to-aft gimbal axes;
   (d) a second mounting mechanism structured to pivotally mount the upper frame portion about a horizontally- and transversely-oriented hitch axis relative to the lower frame portion, the second mounting mechanism including:
  (1) a pair of opposing resilient members, each having:
    (A) an inner shell member with a longitudinal axis aligned colinearly with the transverse hitch axis, the inner shell member having a square-shaped cross-section with four sides and four rounded corners wherein opposing outer corner surfaces thereof are spaced apart by a predetermined first dimension,
    (B) an outer shell member with a longitudinal axis aligned colinearly with the transverse hitch axis, the outer shell member having a square-shaped cross-section with four corners and sides wherein opposing inner side surfaces thereof are spaced apart by a predetermined second dimension and wherein a magnitude of the predetermined second dimension is greater than a magnitude of the predetermined first dimension, the outer shell member being rotated approximately 45° about the transverse hitch axis relative to the inner shell member, and
    (C) a plurality of elongate resilient elements spaced between the outer and inner shell members, each resilient element being spaced between a respective side of the inner shell member and a respective corner of the outer shell member of a respective one of the pair of opposing resilient members;
  (2) a pair of opposing brackets, each having a first bracket portion fixedly secured to the upper frame portion and to a respective one of the inner shell members and a second bracket portion fixedly secured to a respective one of the outer shell members and to a respective one of the first and second side members; each of the opposing brackets structured to limit angular displacement of the outer shell member relative to the inner shell member of the respective resilient member to a maximum predetermined angle about the transverse hitch axis, and
(e) a fifth wheel hitch mechanism mounted to the upper frame portion; and
(f) wherein the second mounting mechanism has an inactivated configuration wherein the upper frame portion is not pivotally biased about the transverse hitch axis relative to the lower frame portion, and an activated configuration wherein the upper frame portion is pivotally biased about the transverse hitch axis relative to the lower frame portion, and
(g) wherein the second mounting mechanism is structured wherein, when relative fore and aft movements between the fifth wheel or gooseneck trailer and the towing vehicle cause the upper frame portion to be displaced about the transverse hitch axis from the inactivated configuration to the activated configuration, the plurality of resilient elements responsively bias the respective inner shell members and the upper frame portion relative to the outer shell members and the lower frame portion about the transverse hitch axis toward the inactivated configuration.

3. An apparatus for connecting a fifth wheel or gooseneck trailer to a towing vehicle having a bed, the apparatus comprising:
(a) a lower frame portion having a lower element;
(b) a first mounting mechanism fixedly secured to the lower element, the first mounting mechanism removably and non-rotatably mounting the lower frame portion to the bed of the towing vehicle, wherein the first mounting mechanism includes:
  (1) a ball hitch member including a hitch ball fixedly secured to, and extending upwardly from, the bed of the towing vehicle, the hitch ball having a non-circular cavity with a tapped partial bore formed in an upper extremity thereof;
  (2) a receiver member fixedly secured to the lower element of the lower frame portion, the receiver member having a first stop mechanism and a ball cavity structured to receive the hitch ball therein;
  (3) a stop plate having a second stop mechanism structured to mate with the first stop mechanism, a plate throughbore, and a protrusion structured to mate with the non-circular cavity; and
  (4) a fastener structured to threadably mate with the tapped partial bore wherein the protrusion operably and non-rotatably mates with the non-circular cavity and the first stop mechanism operably and non-rotatably mates with the second stop mechanism;
(c) an upper frame portion;
(d) a second mounting mechanism including a pair of opposing resilient members structured to pivotally mount the upper frame portion about a horizontally-oriented transverse hitch axis relative to the lower frame portion, the second mounting mechanism having:
  (1) an inactivated configuration wherein the upper frame portion is not pivotally biased about the transverse hitch axis relative to the lower frame portion, and
  (2) an activated configuration wherein the upper frame portion is pivotally biased about the transverse hitch axis relative to the lower frame portion; and
(e) a fifth wheel hitch mechanism mounted to the upper frame portion; and
(f) wherein relative fore and aft movements between the fifth wheel or gooseneck trailer and the towing vehicle cause the upper frame portion to be displaced about the transverse hitch axis from the inactivated configuration to the activated configuration whereupon the pair of opposing resilient members responsively bias the upper frame portion about the transverse hitch axis and toward the inactivated configuration relative to the lower frame portion.

4. An apparatus as described in claim 3, wherein the upper frame portion includes a gimbal pivotally mounted about a transverse gimbal axis.

5. An apparatus as described in claim 3, wherein the upper frame portion includes a gimbal pivotally mounted about a fore-to-aft gimbal axis.

6. An apparatus for connecting a fifth wheel or gooseneck trailer to a towing vehicle having a bed, the apparatus comprising:
(a) a lower frame portion having a lower element;
(b) a first mounting mechanism fixedly secured to the lower element, the first mounting mechanism removably and non-rotatably mounting the lower frame portion to the bed of the towing vehicle, wherein the first mounting mechanism includes:
  (1) a receiver element fixedly secured to the bed of the towing vehicle and having a receiver cavity;
  (2) an adapter element having an outer wall, an upper end with a tapped partial bore, and a lower end structured to be removably and non-rotatably securable in the receiver cavity;
  (3) a bushing element fixedly secured to the lower element of the lower frame portion; the bushing element having an upper end, a lower end, an outer wall, and a bushing cavity with a bushing wall; the bushing element being structured and dimensioned wherein the upper end of the adapter element is removably and non-rotatably securable in the bushing cavity; and (4) a clamping element having a lower surface with a threaded portion extending downwardly therefrom, the threaded portion being structured and dimensioned to threadably mate with the tapped partial bore of the adapter element; and (5) wherein the clamping element, cooperatively with the tapped partial bore, operably and non-rotatably clamps the bushing element, the adapter element, and the receiver element together while also clamping the lower element of the lower frame portion to the bed of the towing vehicle;

(c) an upper frame portion;

(d) a second mounting mechanism including a pair of opposing resilient members structured to pivotally mount the upper frame portion about a horizontally-oriented transverse hitch axis relative to the lower frame portion, the second mounting mechanism having:

(1) an inactivated configuration wherein the upper frame portion is not pivotally biased about the transverse hitch axis relative to the lower frame portion, and (2) an activated configuration wherein the upper frame portion is pivotally biased about the transverse hitch axis relative to the lower frame portion; and (e) a fifth wheel hitch mechanism mounted to the upper frame portion; and (f) wherein relative fore and aft movements between the fifth wheel or gooseneck trailer and the towing vehicle cause the upper frame portion to be displaced about the transverse hitch axis from the inactivated configuration to the activated configuration whereupon the pair of opposing resilient members responsively bias the upper frame portion about the transverse hitch axis and toward the inactivated configuration relative to the lower frame portion.

7. An apparatus as described in claim 6, wherein:

(a) the receiver element includes:

(1) the receiver cavity being cylindrically-shaped with a cavity wall, (2) a receiver peg extending radially inwardly from the cavity wall, and (3) an upper end spaced approximately flush with the bed of the towing vehicle; and (b) the adapter element is cylindrically-shaped and includes a lower slot having a vertical portion extending longitudinally upwardly along the outer wall from the lower end of the adapter element, and a horizontal portion opening into the vertical portion and extending peripherally along the outer wall near the lower end of the adapter element, the horizontal portion including a detent; and (c) wherein the adapter element is removably securable to the receiver element by slidably inserting the lower end of the adapter element downwardly into the receiver cavity with the receiver peg is received by the vertical and horizontal portions of the lower slot and positioned in the detent of the lower slot.

8. An apparatus as described in claim 6, wherein:

(a) the adapter element includes an upper slot extending longitudinally along the outer wall from the upper end thereof; and (b) the bushing element includes a bushing peg extending radially inwardly from the bushing wall; and (c) wherein the bushing element is removably and non-rotatably securable to the adapter element by slidably inserting the lower end of the bushing element downwardly around the upper end of the adapter element with the bushing peg received by the upper slot of the adapter element.

9. An apparatus as described in claim 6, wherein the first mounting mechanism comprises:

(a) the receiver element including:

(1) the receiver cavity being cylindrically-shaped with a cavity wall, (2) a receiver peg extending radially inwardly from the cavity wall, and (3) an upper end of the receiver element being spaced approximately flush with the bed of the towing vehicle;

(b) the adapter element being cylindrically-shaped and including:

(1) a first slot having a vertical portion extending longitudinally upwardly from the lower end of the adapter element and along the outer wall and a horizontal portion opening into the vertical portion and extending peripherally along the outer wall near the lower end of the adapter element, the horizontal portion including a detent, (2) a second slot extending longitudinally along the outer wall from the upper end of the adapter element, and (3) the lower end of the adapter element being slidably insertable downwardly into the receiver cavity with the receiver peg receivable by the first slot;

(c) the bushing element including:

(1) a bushing peg extending radially inwardly from the bushing wall, and (2) the bushing cavity being slidably insertable around the upper end of the adapter element with the bushing peg received by the second slot of the adapter element; and (d) wherein, as the threaded portion of the clamping element is mated with the tapped partial bore of the adapter element with the receiver peg received in the first slot and positioned in the detent and the bushing peg received in the second slot, the lower surface of the clamping element abuttingly engages the upper end of the bushing element and the lower end of the bushing element abuttingly engages the upper end of the receiver element thereby firmly and non-rotatably seating the receiver peg in the detent and also non-rotatably securing the lower frame portion against the bed of the towing vehicle.

10. An apparatus as described in claim 6, wherein the upper frame portion includes a gimbal pivotally mounted about a transverse gimbal axis.

11. An apparatus as described in claim 6, wherein the upper frame portion includes a gimbal pivotally mounted about a fore-to-aft gimbal axis.

12. An apparatus for connecting a fifth wheel or gooseneck trailer to a towing vehicle having a bed, the apparatus comprising:

(a) a lower frame portion having a lower element;

(b) a first mounting mechanism fixedly secured to the lower element, the first mounting mechanism removably and non-rotatably mounting the lower frame portion to the bed of the towing vehicle;

(c) an upper frame portion;

(d) a second mounting mechanism including:
  (1) the lower frame portion having transversely positioned first and second side members fixedly secured to, and extending upwardly from, opposing ends of the lower element;
  (2) a pair of opposing resilient members structured to pivotally mount the upper frame portion about a horizontally-oriented transverse hitch axis relative to the lower frame portion, each resilient member having:
    (A) an inner shell member with a longitudinal axis also aligned colinearly with the transverse hitch axis, the inner shell member being non-rotatably secured to the upper frame portion, and
    (B) an outer shell member with a longitudinal axis aligned colinearly with the transverse hitch axis, and
    (C) at least one resilient element spaced between the outer and inner shell members;
  (3) a pair of opposing brackets, each having a first bracket portion fixedly secured to the upper frame portion and non-rotatably secured to the inner shell member of a respective one of the resilient members, and a second bracket portion fixedly secured to the outer shell member of the respective resilient member and to a respective one of the first and second side members; the first bracket portion being mounted wherein the first bracket portion pivots about the transverse hitch axis relative to the second bracket portion; and
  (4) wherein the second mounting mechanism has:
    (A) an inactivated configuration wherein the upper frame portion is not pivotally biased about the transverse hitch axis relative to the lower frame portion, and
    (B) an activated configuration wherein the upper frame portion is pivotally biased about the transverse hitch axis relative to the lower frame portion; and
(e) a fifth wheel hitch mechanism mounted to the upper frame portion; and
(f) wherein the inner and outer shell members and the at least one resilient element are structured such that, when relative fore and aft movements between the fifth wheel or gooseneck trailer and the towing vehicle cause the upper frame portion to be displaced about the transverse hitch axis from the inactivated configuration to the activated configuration, the at least one resilient element of each resilient member responsively biases the respective outer shell member about the transverse hitch axis relative to the respective inner shell member and toward the inactivated configuration.

13. An apparatus as described in claim 12, wherein each of the opposing brackets limits angular displacement of the outer shell member about the transverse hitch axis relative to the inner shell member of the respective resilient member to a maximum predetermined angle.

14. An apparatus as described in claim 13, wherein the maximum predetermined angle is approximately ±35° about an angle corresponding to the inactivated configuration.

15. An apparatus as described in claim 12, wherein:
(a) the second bracket portion includes an arcuate slot; and
(b) the first bracket portion includes a peg captured in the arcuate slot; and
(c) the peg is slidably displaced along the arcuate slot as the upper frame portion is displaced to and from the activated and inactivated configurations relative to the lower frame portion about the transverse hitch axis.

16. An apparatus as described in claim 12, wherein each resilient member of the pair of opposing resilient members includes:
(a) the inner shell member having a square-shaped cross-section with four rounded corners wherein opposing outer corner surfaces thereof are spaced apart by a predetermined first dimension, and
(b) the outer shell member having a square-shaped cross-section with four corners and sides wherein opposing inner side surfaces thereof are spaced apart by a predetermined second dimension and wherein a magnitude of the predetermined second dimension is greater than a magnitude of the predetermined first dimension, the outer shell member being rotated approximately 45° about the transverse hitch axis relative to the inner shell member.

17. An apparatus as described in claim 16, wherein each resilient member of the pair of opposing resilient members comprises the at least one resilient element including four elongate resilient elements, each spaced between a respective side of the inner shell member and a respective corner of the outer shell member.

18. An apparatus as described in claim 16, wherein each resilient member of the pair of opposing resilient members includes the at least one resilient element being a single resilient element structured and dimensioned to substantially occupy the entire space between the inner and outer shell members.

19. An apparatus as described in claim 12, wherein each resilient member of the pair of opposing resilient members includes:
(a) the inner shell member being cylindrically-shaped with a longitudinal axis and an outer surface with three equi-angularly-spaced vanes extending radially outwardly therefrom away from the longitudinal axis;
(b) the outer shell member being cylindrically-shaped with a longitudinal axis and an inner surface with three equi-angularly-spaced vanes extending radially inwardly toward the longitudinal axis, wherein the longitudinal axes of the inner and outer shell members are colinearly aligned with the transverse hitch axis and wherein the three vanes of the inner shell member are alternately spaced between the three vanes of the outer shell member; and
(c) the at least one resilient element including six elongate resilient elements, each spaced and compressed between a respective vane of the inner shell member and a respective vane of the outer shell member.

\* \* \* \* \*